US009804864B1

(12) United States Patent
Sharma et al.

(10) Patent No.: US 9,804,864 B1
(45) Date of Patent: Oct. 31, 2017

(54) METHOD OF MAPPING INPUTS AND SYSTEM THEREOF

(71) Applicant: BlueStack Systems, Inc., Campbell, CA (US)

(72) Inventors: Shashi Kant Sharma, Haryana (IN); Sharad Agrawal, Haryana (IN); Suman Saraf, Haryana (IN); David P. Reese, Jr., Sunnyvale, CA (US)

(73) Assignee: Bluestack Systems, Inc., Campbell, CA (US)

( * ) Notice: Subject to any disclaimer, the term of this patent is extended or adjusted under 35 U.S.C. 154(b) by 140 days.

(21) Appl. No.: 13/644,752

(22) Filed: Oct. 4, 2012

Related U.S. Application Data (60) Provisional application No. 61/545,079, filed on Oct. 7, 2011.

(51) Int. Cl.
*G06F 9/445* (2006.01)
*G06F 9/455* (2006.01)
*G06F 3/01* (2006.01)

(52) U.S. Cl.
CPC .......... *G06F 9/445* (2013.01); *G06F 9/45558* (2013.01); *G06F 3/01* (2013.01); *G06F 9/45533* (2013.01)

(58) Field of Classification Search
CPC ............. G06F 9/45558; G06F 9/45533; G06F 2201/815; G09F 2009/4557; H04L 63/0272
USPC ................................................. 345/173–179
See application file for complete search history.

(56) References Cited

U.S. PATENT DOCUMENTS

| 7,015,898 | B2 * | 3/2006 | Wang ............................ 345/168 |
| 7,647,491 | B2 | 1/2010 | Kawano et al. |
| 7,987,432 | B1 * | 7/2011 | Grechishkin et al. ........ 715/778 |
| 8,117,554 | B1 | 2/2012 | Grechishkin et al. |
| 8,161,275 | B1 | 4/2012 | Woodward |
| 8,438,375 | B1 | 5/2013 | Woodward |
| 2002/0023265 | A1 * | 2/2002 | Metcalf ........................... 725/74 |
| 2003/0224843 | A1 * | 12/2003 | Wang ................................ 463/1 |
| 2005/0114870 | A1 | 5/2005 | Song et al. |
| 2005/0131668 | A1 * | 6/2005 | Traut .............................. 703/22 |
| 2007/0288944 | A1 * | 12/2007 | Kato .................... G06F 9/44521 719/331 |
| 2008/0133903 | A1 | 6/2008 | Sun et al. |
| 2008/0216071 | A1 | 9/2008 | Gidalov |

(Continued)

*Primary Examiner* — Kent Chang
*Assistant Examiner* — Sujit Shah
(74) *Attorney, Agent, or Firm* — The Webb Law Firm (57) ABSTRACT

Embodiments of the present invention are directed to a method of mapping inputs and system thereof. A computing device is configured to access a previously created profile for, such as, game play using a communicatively coupled controller to manipulate events on the computing device. The profile can be locally accessed from the computing device or remotely accessed from a cloud. The profile includes at least one mapping, each associating an input from the controller to an instruction understandable by an event on the computing device. The controller is integral with the computing device or is a physically disjoint device separate from the computing device. In some embodiments, the computing device is communicatively coupled with a camera configured to capture the input. One or more features of the controller can also be mapped to instructions understandable by the computing device.

27 Claims, 3 Drawing Sheets

(56) References Cited

U.S. PATENT DOCUMENTS

| | | | |
|---|---|---|---|
| 2008/0319911 A1* | 12/2008 | Faith | G06Q 20/341 705/65 |
| 2009/0019436 A1* | 1/2009 | Hartz | G06F 8/65 717/178 |
| 2009/0113355 A1* | 4/2009 | Koo | G06F 3/0488 715/863 |
| 2009/0132560 A1* | 5/2009 | Vignet | G06F 17/246 |
| 2010/0103136 A1* | 4/2010 | Ono et al. | 345/173 |
| 2010/0199037 A1 | 8/2010 | Umbehocker et al. | |
| 2010/0240417 A1* | 9/2010 | Wickman et al. | 455/566 |
| 2010/0277489 A1* | 11/2010 | Geisner et al. | 345/581 |
| 2010/0302165 A1* | 12/2010 | Li | 345/168 |
| 2010/0323762 A1* | 12/2010 | Sindhu | G06F 1/1613 455/566 |
| 2011/0016299 A1 | 1/2011 | Galicia et al. | |
| 2011/0035355 A1 | 2/2011 | Sagar et al. | |
| 2011/0043475 A1* | 2/2011 | Rigazio et al. | 345/173 |
| 2011/0082900 A1 | 4/2011 | Nagpal et al. | |
| 2011/0126216 A1 | 5/2011 | Galicia et al. | |
| 2011/0173204 A1* | 7/2011 | Murillo | A63F 13/06 707/741 |
| 2011/0173574 A1* | 7/2011 | Clavin | G06F 3/017 715/863 |
| 2011/0190061 A1* | 8/2011 | Takeda et al. | 463/39 |
| 2011/0197132 A1* | 8/2011 | Escoda | H04L 67/38 715/733 |
| 2011/0231280 A1* | 9/2011 | Farah | G06Q 10/10 705/26.8 |
| 2011/0276621 A1 | 11/2011 | Edery et al. | |
| 2011/0302630 A1* | 12/2011 | Nair | G06F 21/41 726/4 |
| 2012/0011513 A1 | 1/2012 | McConaughy et al. | |
| 2012/0023507 A1 | 1/2012 | Travis | |
| 2012/0042159 A1 | 2/2012 | Liu | |
| 2012/0059813 A1* | 3/2012 | Sejnoha | G06F 17/30637 707/707 |
| 2012/0066675 A1* | 3/2012 | Shelansky | G06F 9/44526 717/178 |
| 2012/0079095 A1 | 3/2012 | Evans et al. | |
| 2012/0086716 A1 | 4/2012 | Reeves et al. | |
| 2012/0089906 A1 | 4/2012 | Reeves et al. | |
| 2012/0089992 A1 | 4/2012 | Reeves et al. | |
| 2012/0110315 A1 | 5/2012 | Lee | |
| 2012/0110496 A1 | 5/2012 | Lee et al. | |
| 2012/0143900 A1 | 6/2012 | Ainslie et al. | |
| 2012/0191961 A1 | 7/2012 | Wu et al. | |
| 2012/0216181 A1 | 8/2012 | Arcese et al. | |
| 2012/0303476 A1 | 11/2012 | Krzyzanowski et al. | |
| 2013/0024778 A1 | 1/2013 | Reeves et al. | |
| 2013/0047150 A1 | 2/2013 | Malasky et al. | |
| 2013/0054952 A1 | 2/2013 | Shen | |
| 2013/0074069 A1 | 3/2013 | Li | |
| 2013/0095785 A1 | 4/2013 | Sadana et al. | |
| 2013/0120279 A1* | 5/2013 | Plichta et al. | 345/173 |
| 2013/0139182 A1 | 5/2013 | Sethuraman et al. | |
| 2013/0268397 A1 | 10/2013 | Mehta et al. | |
| 2014/0007222 A1 | 1/2014 | Qureshi et al. | |

* cited by examiner

METHOD OF MAPPING INPUTS AND SYSTEM THEREOF

RELATED APPLICATIONS

This application claims benefit of priority under 35 U.S.C. section 119(e) of the U.S. Provisional Patent Application Ser. No. 61/545,079, filed Oct. 7, 2011, entitled "System and Method for Mapping Keys to Touch or Mouse Clicks," which is hereby incorporated by reference in its entirety.

FIELD OF THE INVENTION

The present invention relates to input mappings. More particularly, the present invention relates to a method of mapping inputs and system thereof.

BACKGROUND OF THE INVENTION

With the proliferation input devices, the ability to select and use any of the input devices to operate an application, such as a game, is becoming useful, especially if the computing device that the game is being executed on does not have or is not able to access features necessary to effectively operate or play the game. For example, a multi-touch game, which is typically played on a touch device such as a tablet, can be downloaded on a PC; however, a player cannot fully enjoy game play because the PC lacks touch capabilities to control game play such as moving an object(s) in the game. For another example, when the user is running the multi-touch game on the tablet, the user could find that the tablet's native accelerometer feature is broken, thereby preventing the player to move the object(s) in the game by tilting the tablet.

The present invention addresses at least these limitations in the prior art.

SUMMARY OF THE INVENTION

Embodiments of the present invention are directed to a method of mapping inputs and system thereof. A computing device is configured to access a previously created profile for, such as, game play using a communicatively coupled controller to manipulate events on the computing device. The profile can be locally accessed from the computing device or remotely accessed from a wired or wireless network such as a cloud. The profile includes at least one mapping, each associating an input from the controller to an instruction understandable by an event on the computing device. The controller can be integral with the computing device or can be a physically disjoint device separate from the computing device. In some embodiments, the computing device is communicatively coupled with a camera configured to capture the input. One or more features of the controller can also be mapped to instructions understandable by the computing device.

In one aspect, a non-transitory computer-readable medium is provided. The non-transitory computer-readable medium stores instructions that, when executed by a computing device, cause the computing device to perform a method. The method includes receiving a first set of instructions, mapping the first set of instructions to a second set of instructions according to a configurable profile, and controlling an event based on the mapping.

The first set of instructions can include one or more instructions. In some embodiments, the first set of instructions is input provided via image tracking.

In some embodiments, the first set of instructions is input provided by an input mechanism communicatively coupled with the computing device. The input mechanism can be integral with the computing device, or can be a physically disjoint device separate from the computing device.

The second set of instructions can also include one or more instructions. The second set of instructions is typically understandable by the event.

The configurable profile includes at least one function. In some embodiments, each function describes a mapping from one set of user instructions to another set of instructions configured to change a state of the event.

In some embodiments, the method includes, prior to receiving a first set of instructions, automatically selecting the configurable profile to be used.

In another aspect, a non-transitory computer-readable medium is provided. The non-transitory computer-readable medium stores instructions that, when executed by a computing device, cause the computing device to perform a method. The method includes obtaining at least one input, obtaining at least one instruction understandable by an event, associating the at least one input with the at least one instruction, and creating a profile including the association. The profile can be global or in context of an application.

In some embodiments, the at least one input includes a key or a sequence of keys. In some embodiments, the at least one instruction includes one or more gestures. A gesture can be a mouse click or a touch. However, other suitable gestures are contemplated.

In some embodiments, the method also includes tuning parameters affiliated with the association. In some embodiments, the method also includes the profile during execution of an application.

In yet another aspect, a system is provided. The system includes a controller, a computing device in communication with the controller, and a profile. The profile is typically accessible by the computing device and includes at least one mapping of an input from the controller to an event on the computing device.

In some embodiments, the controller is integral with the computing device. In some embodiments, the controller is a physically disjoint device separate from the computing device. The controller and the computing device can be in communication using Wi-Fi, Bluetooth, ZigBee, or a combination thereof. Other communication protocols are contemplated.

An exemplary controller is a smart phone, a tablet, a joystick, a card having a glyph thereon, a keypad or a mouse. An exemplary computing device is a desktop computer, a laptop computer, a server or a smart TV. In some embodiments, the computing device is coupled with a camera configured to detect at least one of motion and light.

In some embodiments, an application, a cursor, or both on the computing device is manipulated by the controller.

In some embodiments, the computing device includes a native operating system and a guest operating system. In some embodiments, the application on the computing device manipulated by the controller is a guest-operating system specific application.

In some embodiments, a feature set of the controller is exposed to the computing device. In some embodiment, each feature of the feature set is mapped in the profile.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Overview

Embodiments of the present invention are directed to a method of mapping inputs and a system thereof. A computing device is configured to access a previously created profile for, such as, game play using a communicatively coupled controller to manipulate events on the computing device. The profile can be locally accessed from the computing device or remotely accessed from a cloud. The profile includes at least one mapping, each associating an input from the controller to an instruction understandable by an event on the computing device. The controller is integral with the computing device or is a physically disjoint device separate from the computing device. In some embodiments, the computing device is communicatively coupled with a camera configured to capture the input. One or more features of the controller can also be mapped to instructions understandable by the computing device.

Figure 1A:
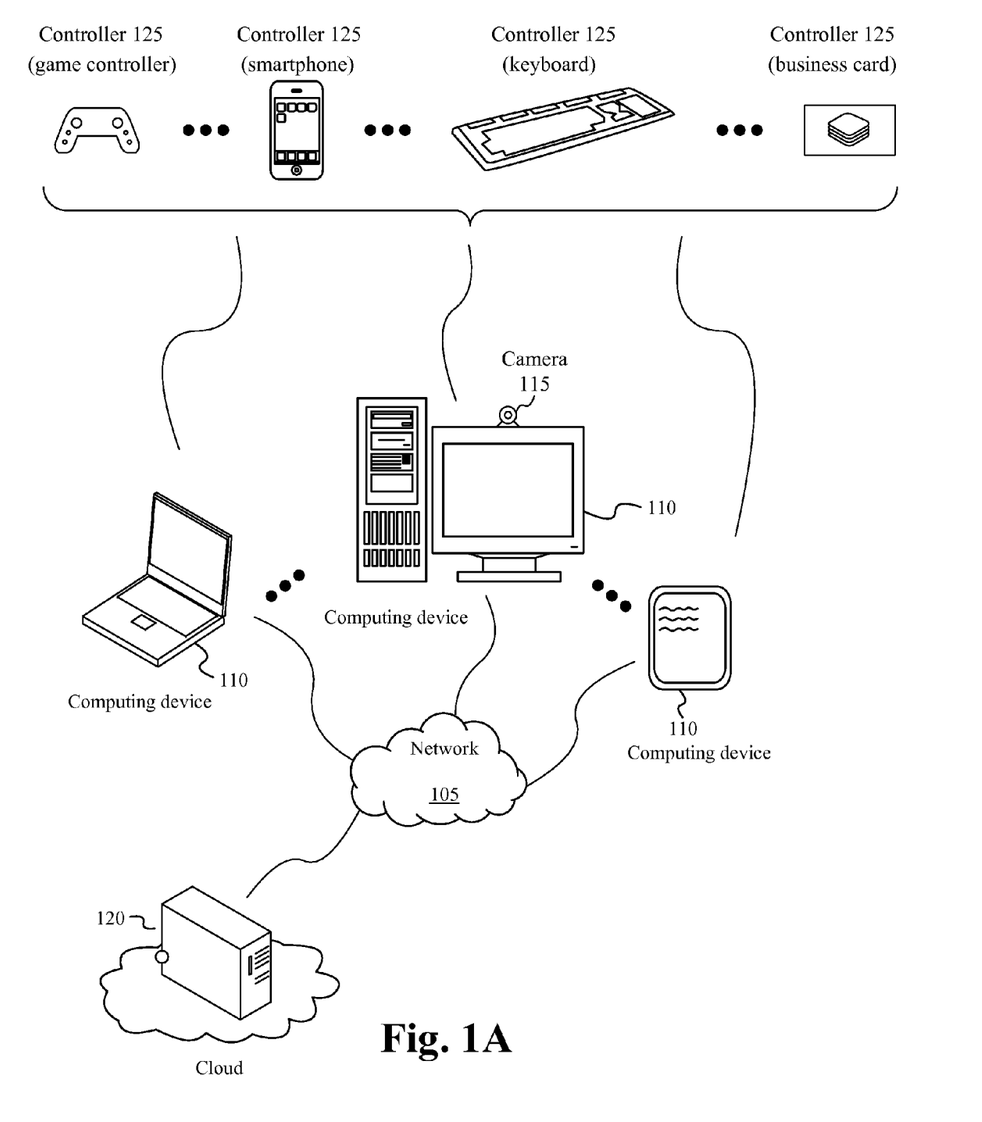
FIG. 1A illustrates an overview of an exemplary system for implementing an embodiment of the present invention.

FIG. 1A illustrates an overview of an exemplary system 100 for implementing an embodiment of the present invention. As shown in FIG. 1A, the system 100 includes at least one computing device 110. A computing device 110 can be a smart phone, a personal computer (e.g., desktop, laptop), a server, a tablet, a smart TV or any suitable network-enabled device. A computing device 110 can be communicatively coupled with a network 105 to access data and/or a service(s) in a cloud 120. It will be understood that the network 105 can be a LAN network, a WLAN network, a WAN network, a MAN network, an Internet network, a cellular network maintained by a cellular carrier, such as a GSM or CDMA network, and/or some other wired or wireless communications link.

A computing device 110 can include a multi-OS runtime with virtualization technology, which allows applications developed for different operating systems to execute simultaneously, side-by-side, on the same computing device 110. Multi-OS runtime and an application player for running such applications are disclosed in co-pending application Ser. No. 13/479,086, filed May 23, 2012, entitled "Apparatuses, Systems and Methods of Switching Operating Systems," which is hereby incorporated by reference. An application player associated with a guest operating system can be installed on the computing device 110 to allow guest operating system specific programs to execute within that guest environment. In some embodiments, the application player is configured to open the guest operating system in an overlay. An overlay can be a window, a browser, a player or the like. Alternatively, the guest operating system can be opened in a full screen mode.

In some embodiments, the application player is also configured as an application broker, which interfaces with one or more application stores to download applications therefrom. An exemplary application broker is disclosed in co-pending application Ser. No. 13/479,056, filed on May 23, 2012, entitled "Application Player," which is also hereby incorporated by reference.

A computing device 110 is able to access a profile, which can be downloaded from the cloud 120. Alternatively or in addition to, users are able to use computing devices 110 to locally create profiles and to locally store these profiles on the computing devices 110 and/or to publish the profiles to the cloud 120. An exemplary cloud is disclosed in co-pending application Ser. No. 13/543,052, filed on Jul. 6, 2012, entitled "Cloud-Based Data Synchronization," which is also hereby incorporated by reference.

A profile typically is configurable and includes at least one function, describing a mapping from one set of instructions to another set of instructions that is configured to change a state of an event on the computing device 110. Profiles are further discussed below.

A computing device 110 is also able to communicatively couple with at least one controller 125 configured to provide input to the computing device 110. A controller 125 can be game controller, a smart phone, a keyboard, a mouse, a tablet, a joystick, a card having a glyph thereon or any suitable controlling device configured to provide inputs. A computing device 110 is able to couple with at least one controller 125 via a wired or wireless connection. An exemplary wireless connection is Wi-Fi, Bluetooth, ZigBee, or the like. An exemplary wired connection is USB or the like.

A controller 125 can be integral with a computing device 110, such as a laptop keyboard and a laptop computer, or a soft keyboard on a tablet. Alternatively, a controller 125 can be a physically disjoint device separate from a computing device, such as a game controller and a desktop computer, wherein the controller 125 and the computing device 110 can be paired using a pairing method. A controller 125 is typically used to provide inputs to a computing device 110 to control event(s) on the computing device 110.

A computing device 110 is also able to communicatively couple with a camera 115 to capture the inputs. In some embodiments, the inputs are captured via image tracking. In some embodiments, the camera 130 is able to detect motion. Alternatively or in addition to, the camera 130 is able to detect light, such as infrared.

Figure 1B:
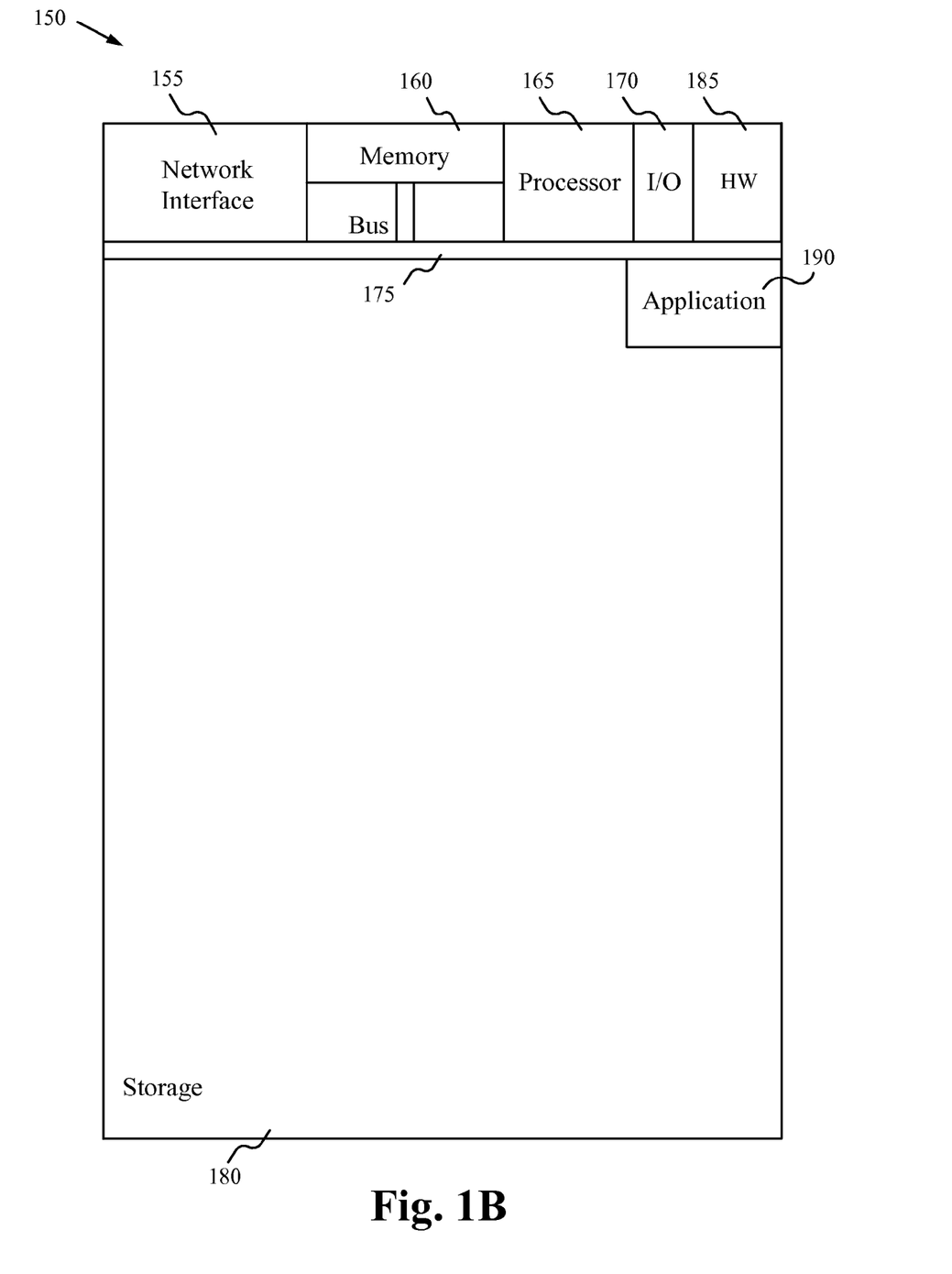
FIG. 1B illustrates a block diagram of an exemplary computing device in accordance with the present invention.

FIG. 1B illustrates a block diagram of an exemplary computing device 150 in accordance with the present invention. The computing device 150 is able to be used to acquire, cache, store, compute, search, transfer, communicate and/or display information. For example, the computing device 150 is able to execute procedures to switch between operating systems. For another example, the computing device 150 is able to execute guest operating system specific applications. For yet another example, the computing device 150 is able to access a service(s) and/or data from a cloud. For yet another example, the computing device 150 is able to access a profile either locally from thereon or remotely from the cloud. For yet another example, the computing device 150 is able to map inputs into a set of instructions understandable by an event on the computing device.

In general, a hardware structure suitable for implementing the computing device 150 includes a network interface 155, a memory 160, processor(s) 170, I/O device(s) 170, a bus 175 and a storage device 180. The choice of processor is not critical as long as a suitable processor with sufficient speed is chosen. The memory 160 is able to be any conventional computer memory known in the art. The storage device 180 is able to include a hard drive, CDROM, CDRW, DVD, DVDRW, flash memory card, RAM, ROM, EPROM, EEPROM or any other storage device. The computing device 150 is able to include one or more network interfaces 155. An example of a network interface includes a network card connected to an Ethernet or other type of LAN. The I/O device(s) 170 are able to include one or more of the following: keyboard, mouse, monitor, display, printer, modem, touchscreen, button interface and other devices. Application(s) 190, such as games and software for mapping inputs, are likely to be stored in the storage device 180 and memory 160 and are processed by the processor 165. More or less components shown in FIG. 1B are able to be included in the computing device 150. In some embodiments, hardware 185 for mapping inputs is included. Although the computing device 150 in FIG. 1B includes applications 190 and hardware 185 for mapping inputs, mapping inputs can be implemented on a computing device in hardware, firmware, software or any combination thereof.

Input Mappings

For illustration purposes, assume that the computing device (e.g., controlled device) is a desktop computer that is able to support a plurality of operating systems. Also assume that the controller (e.g., input mechanism) is a keyboard that is communicatively coupled with the desktop computer. Typically, the plurality of operating systems includes a host operating system and at least one guest operating system. The host operating system can be the same as or different from each guest operating system. Further assume that the host operating system is Windows® 7 and that a guest operating system is Android®, and that a user has downloaded or otherwise received a multi-touch game that is guest operating system specific, such as Farm Invasion™, on the desktop computer. In some embodiments, when Farm Invasion™ is activated either from the host Windows® environment or the guest Android® environment, Farm Invasion™ is launched in an overlay associated with the guest Android® operating system.

Concurrently performing two or more controls could be required to play a multi-touch game, such as Farm Invasion™, or at least to better game play experience. For example, in Farm Invasion™, the user is able to swipe up and down to move a vehicle up and down while concurrently tapping to shoot. However, playing such a touch game on the desktop computer is frustrating since the desktop computer is typically not touch enabled to allow simultaneous manipulations of the game. The user is therefore only able to perform one control at a time. Using a mouse, the user is either able to control the vehicle up and down or shoot at targets, but the user is not able to do both at the same time since the cursor cannot be at more than one location at a time. However, a profile of the present invention can be used in connection with Farm Invasion™ to advantageously allow the user to perform more than one control at a time.

Figure 2:
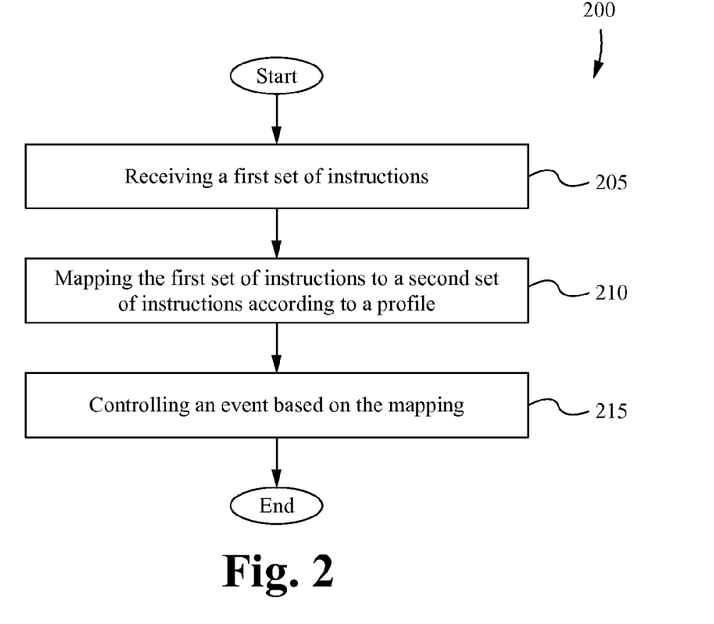
FIG. 2 illustrates an exemplary method of using a profile in accordance with the present invention.

FIG. 2 illustrates an exemplary method 200 of using a profile in accordance with the present invention. The method 200 can be used for game play. The method 200 begins at a step 205, where a first set of instructions is received. The first set of instructions includes one or more instructions, that the user will use to control events on the desktop computer, such as aspects of the game running on the desktop computer. The set of instructions is input provided by the user using the keyboard that is communicatively coupled with the desktop computer. For example, for the first set of instructions, the user can activate a single key, e.g., letter "E," or activate a sequence of keys, e.g., letter "E" immediately followed by letter "R," on the keyboard.

At a step 210, the first set of instructions is mapped to a second set of instructions according to the profile. The profile typically includes functions, each describing a relationship between the first set of instructions and the second set of instructions. The second set of instructions includes one or more instructions understandable by an event that is to be controlled on the desktop computer. The event can be a virtual object in an application executing on the desktop computer. Alternatively, the event can be a virtual object, such as a cursor, in the host environment or the guest environment.

At a step 215, an event is controlled based on the mapping. For example, assume that the key "E" is mapped to swipe up motion. When the user presses on the letter "E," then the vehicle (e.g., event) in Farm Invasion™ moves up. After the step 215, the method 200 ends. The method 200 is typically repeatedly performed until game play has ended.

The profile is typically selected and used during execution of Farm Invasion™. In some embodiments, the profile is stored remotely in a cloud or locally on the desktop computer and is accessed therefrom. In some embodiments, the profile can be automatically selected or manually selected by the user. In some embodiments, the profile can be reconfigured tailored to the user's preferences and thereafter saved prior to game play. The profile can be a global profile (e.g., applying to more than one application or to a class of applications) or can be an application-specific profile.

Although controlling a guest operating system specific application, specifically a game, has been discussed, the present invention is applicable to a host operating system specific application running on a computing device having limited functionalities. For example, the Windows® 8 operating system is best performed on a touch device, but the Windows® 8 operating system can be installed on a laptop computer that lacks the touch functionality. The present invention allows Farm Invasion™ to be played on such a laptop computer, wherein the input mechanism is the native laptop keyboard.

It is also contemplated that any application, whether it be a guest operating system specific application or a host operating system specific application, whether it be a touch application, on a computing device can be controlled. An application is a kids application, a photo application, a social application, a music application, a news application, a messaging application or any other application.

Figure 3:
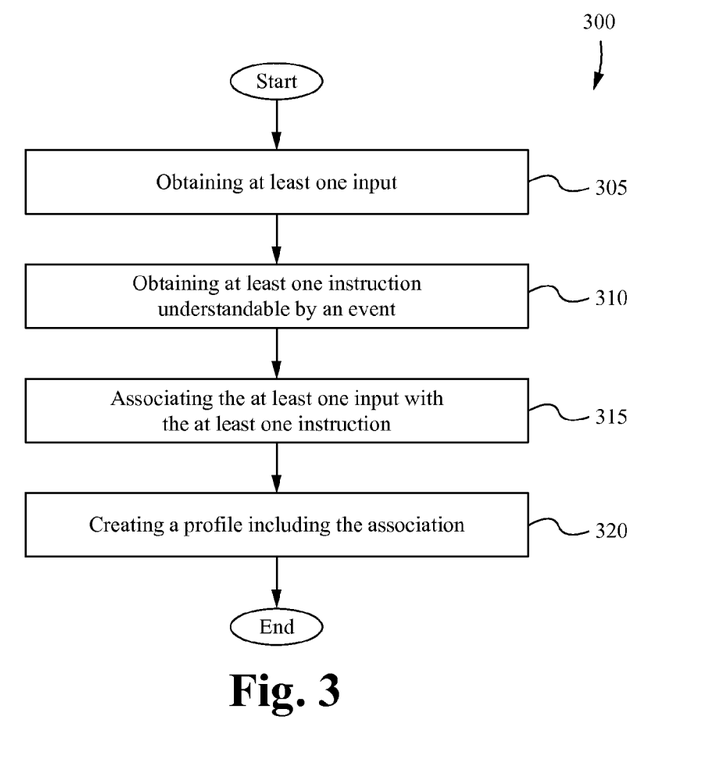
FIG. 3 illustrates an exemplary method of creating or reconfiguring a profile in accordance with the present invention.

FIG. 3 illustrates an exemplary method 300 of creating or reconfiguring a profile in accordance with the present invention. The method 300 begins at a step 305, where at least one input is obtained. In some embodiments, the at least one input includes a key or a sequence of keys that the user will use to control an event on the desktop computer. For example, the user could designate the letter "E" to be used in lieu of the actual swipe up motion during game play.

At a step 310, at least one instruction understandable by an event is obtained. In some embodiments, the at least one instruction includes one or more gestures. A gesture can be mouse click or a touch. For example, to emulate a swipe up motion, the user could use a mouse to click at a first point and thereafter a second point above the first point. For another example, to emulate a tap, the user could use the mouse to click on a point. Other types of instructions are contemplated.

At a step 315, the at least one input is associated with the at least one instruction. Continuing with example, the letter "E" is associated with the swipe up motion. In some embodiments, parameters affiliated with the association can be tuned. For example, the user can specify how far up the vehicle travels every time the key "E" is activated.

At a step 320, a profile including the association from the step 315 is created. In some embodiments, the steps 305-315 are repeated for additional mappings. After all associations are created, the method 300 ends. The profile is typically used when "controlling" an aspect of the controlled device with the controller, such as when playing Farm Invasion™ on the desktop computer with the keyboard. The profile can be locally saved on the desktop computer, remotely saved in the cloud or both, and is accessed from at least one of the two.

The discussion regarding input mappings above has been described relative to mapping keys to single and multi-touch gestures. However, the invention is applicable to other types of mappings including, but not limited to, mapping keys to an accelerometer, a magnetometer, a gyroscope, a barometer and a mouse.

For example, Racing Moto™ is a fast paced racing game, which is typically played on a smart phone. The native accelerometer feature on the smart phone determines the tilt of the smart phone to control direction of a motorbike (e.g., left and right). However, the user is able to use a profile of the present invention to play Racing Moto™ on the desktop computer using the keyboard as the controller. The profile can include mappings of left and right arrow keys with left and right tilts, respectively. When the user activates the left arrow key, the motorbike is steered to the left. When the user activates the right arrow key, the motorbike is steered to the right. The profile can also include a mapping of the "F" key with acceleration and a mapping of the "J" key with breaking. Any parameter in connection with any mapping can be tuned.

Input Types

An input mechanism to provide a first set of instructions described with respective to FIG. 2 is a controller. The input mechanism can be integral with a computing device. For example, the computing device is a laptop computer and the input mechanism is the native keyboard. For another example, the computing device is a smart phone and the input mechanism is a soft keyboard. Alternatively, the input mechanism is a physically disjoint device separate from a computing device. For example, the computing device is a laptop computer and the input mechanism is a smart phone.

In some embodiments, the user is able to play Racing Moto™ on a laptop computer using the native keyboard, a smart phone, or both as input mechanisms. The user is able to switch back and forth between different input mechanisms. For example, the user is able to use arrow keys to steer or simply tilt the smart phone to steer (using the smart phone's native accelerometer). In some embodiments, only one input mechanism is allowed to control events.

In some embodiments, not only is the accelerometer on the smart phone exposed or remoted to the computing device, other features such as touch are also exposed. In some embodiments, a corresponding user interface is presented to the user on the smart phone, which includes soft buttons that can be touched or otherwise activated to, for example, accelerate and break during game play.

In some embodiments, multiple users can play together or compete with one another, one user using the native keyboard to control certain events in a game, and another user using the smart phone to control other events in the game.

A joystick can be similarly used as a controller. If the joystick has a native accelerometer therein, the user is able to steer using the joystick's native accelerometer. The user is also able to depress buttons on the joystick to control other events (e.g., accelerate and break). In fact, the entire feature set of the joystick (or any controller) can be exposed to the computing device.

Typically, once the controller and the computing device are properly paired, any feature on the controller can be used as long as that feature is properly mapped in a profile. For example, if a smart phone has a G.P.S. feature, then the G.P.S. feature can be exposed or remoted, making it appear as if the paired computing device actually has a G.P.S. device coupled therewith. When G.P.S. data is required by the computing device, the G.P.S. of the smart phone is provided.

In some embodiments, providers on a first computing device are proxied automatically or based on user configuration to a second computing device, where the providers can be used. For example, a personal computer can have a picture provider which is proxied to a tablet or a smart phone or a TV to be used. For another example, a mobile phone can provide a SMS provider which is proxied to a personal computer where text messages can be sent and received.

It is contemplated that not only a feature set can be exposed across devices, but a feature set from a first operating system on a computing device can be exposed to a second operating system on the same computing device.

In some embodiments, inputs can be provided via image tracking, which is detected using a camera coupled with the computing device, such as a desktop computer. The camera is configured to detect motion, light or both. Assume that an input mechanism or controller is a card with a glyph thereon. When the glyph is pointed towards the camera, the exact orientation of the glyph can be detected via software. The software can detect panning to the side and rotation. Racing Moto™ can thereby be controlled using such card with a glyph thereon. In other words, the user is able to steer a motorbike by using moving the card in front of the camera.

In addition to steering by moving the card, holes on the card can be used as buttons for touch events. If the camera detects a thumb covering a hole, then it is interpreted as a button depress. If the camera does not detect a thumb covering a hole, then it is not interpreted as a button depress. Alternatively, the card can have emitting light sources thereon that light up different colors. A light source emitting a red light can indicate left. A light source emitting a blue light can indicate right. Embodiments of the present invention advantageously give the user similar game play experience.

Exemplary Use Cases

The above discussion outlines numerous use cases, such as controlling a touch applications on a desktop computer with a keyboard, controlling an application on a desktop computer using a smart phone, and controlling an application on a desktop computer via a camera.

Other exemplary use cases include, but are not limited to, controlling an application on a smart TV with a smart phone, and controlling a cursor with a smart phone. In the latter use case, when the user holds the smart phone in the user's hand, the native accelerometer in the smart phone can be used to determine the orientation of the smart phone to thereby move the cursor on a computing device. In some embodiments, a relative approach is implemented where moving the user's hand forward will gradually move the cursor up. When the user's hand moves back to dead center, the cursor will stop moving. Alternatively, an absolute approach is implemented where moving the user's hand forward will gradually move the cursor up. But, when the user's hand stops moving, the cursor will stop moving. If the user's hand moves back to dead center, the cursor will move to the middle of the screen. Tapping the smart phone can be mapped to depressing a button. The user is able to interact with the computing device using the smart phone such that events on the computing device are thereby controlled. The events can be part of the host operating system, part of the guest operating system or both.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer readable-medium storing instructions that, when executed by a computing device, cause the computing device to perform a method comprising:
   receiving a first instruction from a first controller that is communicatively coupled with the computing device, wherein:
   (i) said first controller implements a first-type user-controller interface;
   (ii) a configurable profile accessible by the computing device includes an association between the first instruction received from the first controller and a second instruction configured to actuate a control event in a guest operating system specific application executing in an application player running on the computing device;
   (iii) the guest operating system specific application is configured to actuate said control event in response to the second instruction that is received from a second controller implementing a second-type user-controller interface, wherein said second-type user-controller interface is different from the first-type user-controller interface;
   (iv) the guest operating system specific application does not recognize the first instruction as an instruction for actuating the control event; and
   (v) the application player is configurable as an application broker to search a plurality of application sources interfacing with the application broker for applications configured to operate on the guest operating system;
   responsive to receiving the first instruction from the first controller, identifying the second instruction based on the association between the first instruction and the second instruction within the configurable profile; and
   actuating the control event based on the identified second instruction.

2. The non-transitory computer-readable medium of claim 1, wherein the first instruction includes at least one user input, and the second instruction includes at least one command.

3. The non-transitory computer-readable medium of claim 1, wherein the first instruction is input provided by an input mechanism implemented by the first controller.

4. The non-transitory computer-readable medium of claim 3, wherein the input mechanism is integral with the computing device.

5. The non-transitory computer-readable medium of claim 3, wherein the input mechanism is a physically disjoint device separate from the computing device.

6. The non-transitory computer-readable medium of claim 1, wherein the first instruction is input provided via image tracking.

7. The non-transitory computer-readable medium of claim 1, wherein the second instruction is understandable by the control event.

8. The non-transitory computer-readable medium of claim 1, wherein the configurable profile comprises at least one function, wherein each function describes a mapping from one set of user instructions to another set of instructions configured to change a state of the control event.

9. The non-transitory computer-readable medium of claim 1, further comprising, prior to receiving the first instruction, automatically selecting the configurable profile to be used.

10. A non-transitory computer-readable medium storing instructions that, when executed by a computing device, cause the computing device to perform a method comprising:
    obtaining an input from a first controller that is communicatively coupled with the computing device, wherein:
    (i) said first controller implements a first-type user-controller interface;
    (ii) the input includes a first instruction intended for actuating a control event in a guest operating system specific application executing in an application player running on the computing device;
    (iii) the guest operating system specific application is configured to actuate said control event in response to a second instruction from a second controller implementing a second-type user-controller interface, wherein said second-type user-controller interface is different from the first-type user-controller interface;
    (iv) the guest operating system specific application does not recognize the first instruction as an instruction for actuating the control event; and
    (v) the application player is configurable as an application broker to search, based on a search text, a plurality of application sources interfacing with the application broker for applications configured to operate on the guest operating system;
    associating the input received from the first controller with the second instruction; and
    creating a profile that includes the association.

11. The non-transitory computer-readable medium of claim 10, wherein the input includes one of a key and a sequence of keys.

12. The non-transitory computer-readable medium of claim 10, wherein the second instruction includes one or more gestures.

13. The non-transitory computer-readable medium of claim 12, wherein a gesture is one of mouse click and a touch.

14. The non-transitory computer-readable medium of claim 10, wherein the profile is a global profile that is applicable to all applications in a class of applications that the guest operating system specific application is classified in, and wherein each of the plurality of application sources is an online application distribution system.

15. The non-transitory computer-readable medium of claim 10, further comprising tuning parameters affiliated with the association.

16. The non-transitory computer-readable medium of claim 10, further comprising using the profile during execution of an application.

17. The non-transitory computer-readable medium of claim 10, wherein the guest operating system specific application performs better on a second device that includes functionalities that the computing device lacks, wherein the application broker returns a results list based on the search text and displays a refined list that excludes duplicate entries from the results list.

18. A system comprising:
   a first controller implementing a first-type user-controller interface;
   a computing device including a native operating system and a guest operating system, wherein the computing device is in communication with the first controller and is configured to:
   receive a first instruction from the first controller, wherein:
   (i) said first controller implements a first-type user-controller interface;
   (ii) a configurable profile accessible by the computing device includes an association between the first instruction received from the first controller and a second instruction configured to actuate a control event in a guest operating system specific application executing in an application player running on the computing device;
   (iii) the guest operating system specific application is configured to actuate said control event in response to the second instruction that is received from a second controller implementing a second-type user-controller interface, wherein said second-type user-controller interface is different from the first-type user-controller interface;
   (iv) the guest operating system specific application does not recognize the first instruction as an instruction for actuating the control event; and
   (v) the application player is configurable as an application broker to search a plurality of application sources interfacing with the application broker for applications configured to operate on the guest operating system;
   respond to receiving the first instruction from the first controller, by identifying the second instruction based on the association between the first instruction and the second instruction within the configurable profile; and
   actuate the control event based on the identified second instruction.

19. The system of claim 18, wherein the first controller is integral with the computing device.

20. The system of claim 18, wherein the first controller is a physically disjoint device separate from the computing device.

21. The system of claim 18, wherein the first controller and the computing device are in communication using at least one of Wi-Fi, Bluetooth and ZigBee.

22. The system of claim 18, wherein the first controller is a card having a glyph thereon.

23. The system of claim 18, wherein the computing device is one of a desktop computer, a laptop computer, a server and a smart TV.

24. The system of claim 18, wherein the computing device is coupled with a camera configured to detect at least one of motion and light.

25. The system of claim 18, wherein at least one of the application and a cursor on the computing device is manipulated by the first controller.

26. The system of claim 18, wherein a feature set of the first controller is exposed to the computing device.

27. The system of claim 26, wherein each feature of the feature set is mapped in the configurable profile.

* * * * *